United States Patent
Jong et al.

(10) Patent No.: US 6,192,403 B1
(45) Date of Patent: *Feb. 20, 2001

(54) METHOD AND APPARATUS FOR ADAPTIVE MONITOR AND SUPPORT SYSTEM

(75) Inventors: Kenneth Jong, Bridgewater; Bernard S L Renger, New Providence; Kurt D. Seidel, Bridgewater, all of NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/997,666

(22) Filed: Dec. 23, 1997

(51) Int. Cl.[7] ............................. G06F 15/173; G06F 15/16
(52) U.S. Cl. ........................ 709/224; 709/223; 709/229; 709/226
(58) Field of Search ................................. 709/220–222, 709/301, 223, 229, 226, 235–240, 251–253, 280; 364/424.01, 424.05, 443, 449.5, 550; 705/811; 707/10.104–3; 710/18, 15, 16; 702/134, 187

(56) References Cited

U.S. PATENT DOCUMENTS

| | | | |
|---|---|---|---|
| 3,651,471 | 3/1972 | Haselwood et al. | 379/92.01 |
| 3,742,463 | 6/1973 | Haselwood et al. | 348/1 |
| 3,772,649 | 11/1973 | Haselwood et al. | 348/1 |
| 4,546,382 | 10/1985 | McKenna et al. | 348/13 |
| 4,912,552 | 3/1990 | Allison, III et al. | 348/13 |
| 4,955,070 | 9/1990 | Welsh et al. | 455/2 |
| 4,972,504 | 11/1990 | Daniel, Jr. et al. | 705/10 |
| 5,115,501 | * 5/1992 | Kerr | 395/600 |
| 5,315,093 | 5/1994 | Stewart | 235/381 |
| 5,400,246 | * 3/1995 | Wilson et al. | 364/146 |
| 5,410,471 | 4/1995 | Alyfuku et al. | 600/300 |
| 5,497,479 | 3/1996 | Hornbuckle | 463/29 |
| 5,613,089 | 3/1997 | Hornbuckle | 711/164 |
| 5,675,510 | 10/1997 | Coffey et al. | 709/224 |
| 5,787,409 | * 7/1998 | Seiffert et al. | 705/8 |
| 5,826,239 | * 10/1998 | Weimin Du et al. | 705/8 |
| 5,857,190 | * 1/1999 | Brown | 707/10 |
| 5,877,957 | * 3/1999 | Bennett | 364/191 |
| 6,012,152 | * 1/2000 | Douik et al. | 714/26 |

* cited by examiner

Primary Examiner—Zarni Maung
Assistant Examiner—Beatriz Prieto

(57) ABSTRACT

This invention provides an adaptive monitor and support system that adapts a monitoring process for monitored devices based on monitored data by downloading instructions and/or monitor/support programs to optimize the monitoring process. A monitor/support shell executes in intelligent monitored devices such as personal computers. For non-intelligent devices, intelligent monitor devices are provided to support the monitor/supporting shell. A profile corresponding to each monitored device identifies device functions that require special monitor and/or support processes which are downloaded from an adaptive monitor and support device located remotely relative to the monitored device. The adaptive monitor and support device analyzes uploaded monitored data and adjusts the monitoring process based on the analysis results by downloading special monitor programs, special support programs, and/or instructions to the monitored devices. The special monitor and/or support programs may also be downloaded directly from third-party databases.

22 Claims, 8 Drawing Sheets

METHOD AND APPARATUS FOR ADAPTIVE MONITOR AND SUPPORT SYSTEM

This application is related to U.S. application Ser. No. 08/625,607 (attorney docket no. Johnson 1-2-6-2) which is hereby incorporated by reference.

BACKGROUND OF THE INVENTION

1. Field of Invention

This invention relates to monitoring and support of operating devices coupled to a network.

2. Description of Related Art

With increasing popularity of home electronic equipment such as personal computers, complex telephone systems, intelligent home appliances and entertainment systems, suppliers have great interests in monitoring the usage of such equipment to gain insight into consumer preferences and equipment performance. Thus, monitoring techniques such as PC Meter provide monitoring of personal computers and generate data such as program usage and duration of computer activity that provide insights into consumer behavior. While the results of current monitoring techniques are very useful, it is difficult to increase the amount of monitored data due to personal computer performance as well as memory required to achieve such monitoring. Thus, new technology is required to provide better monitoring without increasing monitored equipment resources.

SUMMARY OF THE INVENTION

This invention provides an adaptive monitor and support system that adapts a monitoring process for monitored devices based on monitored data by downloading instructions and/or monitor/support programs to optimize the monitoring process. A monitor/support shell executes in the monitored devices such as personal computers that are intelligent and support execution. For those devices that are non-intelligent such as a telephone station or a television, intelligent monitor devices are provided to support the monitor/support shell to achieve the monitoring process.

The monitor/support shell monitors the monitored device based on a profile. The profile identifies device functions that require special monitor and/or support programs. The special monitor and/or support programs are downloaded from an adaptive monitor and support device located remotely relative to the monitored devices.

The adaptive monitor and support device receives monitored data generated by the monitor/support shell and the special monitor/support programs executing in the monitored devices and/or intelligent monitor devices. The adaptive monitor and support device analyzes uploaded monitored data and adjusts the monitoring process based on the analysis results. The adaptive monitor and support device adjusts the monitoring process by either downloading special monitor and/or support programs or by downloading instructions to change the monitoring process.

The special monitor and/or support programs may also be downloaded directly from third-party databases. For example, when an application is launched in the monitored device, a manufacturer of the application may provide support to the user of the application through the adaptive monitor and support system. Thus, when the application of interest is being used by the user, the adaptive monitor and support device may download instructions to the monitor/support shell to instruct the monitor/support shell to download a special support program from the manufacturer of the application software.

Using the above-described techniques, the monitoring process may be optimized to obtain specific information without incurring excessive requirements for memory to store the monitored data or without excessive processing power of the intelligent monitored/monitor devices.

BRIEF DESCRIPTION OF THE DRAWINGS

The invention is described in connection with the following drawings wherein like numerals reference like elements, and wherein.

DETAILED DESCRIPTION OF PREFERRED EMBODIMENTS

Figure 1:
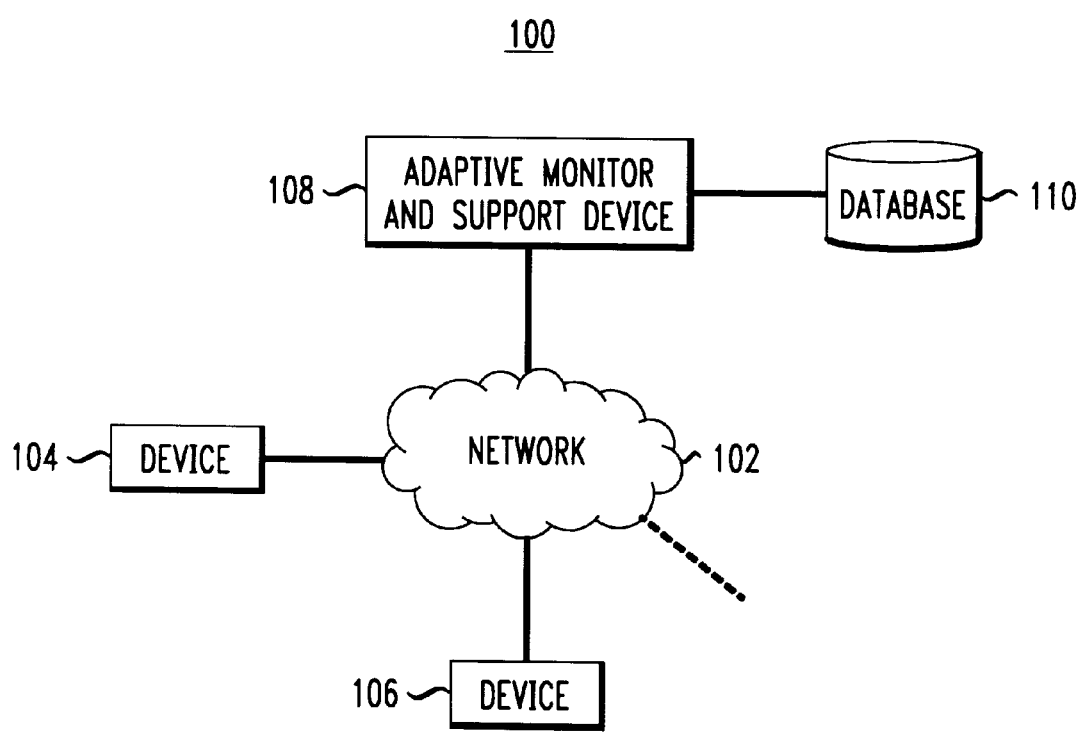
FIG. 1 is a block diagram of an adaptive monitor and support system.

FIG. 1 shows a block diagram of an adaptive monitor and support system 100 that includes devices 104 and 106 coupled to a network 102 and an adaptive monitor and support device 108 also coupled to the network 102. The network 102 may be any communication medium wired or wireless. For example, the network 102 may include, the internet, the public switching telephone network, a cable network, a local area network, a satellite network, etc.

A database 110 is coupled to the adaptive monitor and support device 108. The database 110 stores data necessary to support the adaptive monitor and support system 100 such as profiles and monitored data to be discussed later. While FIG. 1 shows the database 110 coupled directly to the adaptive monitor and support device 108, it could be located elsewhere such as with a server of the network 102 or distributed throughout the network 102, for example.

Each of the devices 104 and 106 contain monitoring programs that record specified activities of the devices 104 and 106 as monitored data (devices 104 and 106 are also referred to as monitored devices 104 and 106). The monitoring programs process the monitored data to detect whether certain device functions are performed and readjust the monitoring process based on such detection.

For example, if the device 104 is a personal computer and a user of the personal computer selects and activates a word processing program on the personal computer screen such as Word 97™, the monitoring program may readjust the monitoring process to record the particular features of the word processor selected by the user. The readjustment may include downloading additional programs from the adaptive monitor and support device 108. In this way, the monitoring process is optimized based on the actual usage of the personal computer 104. The monitored data is processed by the monitoring program and uploaded to the adaptive monitor and support device 108 for further processing.

The adaptive monitor and support device 108 processes the monitored data for many purposes such as, for example, to detect patterns of usage for each of the monitored devices 104 and 106 as well as usage patterns across many users. The adaptive monitor and support device 108 alters the monitoring process in the monitored devices 104 and 106 based on results of analysis of monitored data by downloading additional programs and/or instructions to the monitoring program.

For example, based on specific monitoring requirements, the adaptive monitor and support device 108 may detect that a particular monitored device such as the device 106 has just launched an instance of an application of interest such as a video game (generally multiple instances of an application may be launched if permitted by the operating system and the application). Upon detection of this activity, the adaptive monitoring and support device 108 may download either special instructions to the monitoring program performing the monitoring function in the device 106 or download additional programs to be launched by the monitoring program in the device 106 for special monitoring of the video game (e.g., number of games played and with how many players). Thus, both the monitoring program operating in the devices 104 and 106 as well as the adaptive monitor and support device 108 adaptively adjusts the monitoring process based on the monitored data already collected. In this way, optimized monitoring is accomplished to achieve collection of specific data without requiring the monitored devices 104 and 106 to store all the programs required or for the monitoring programs to account for every situation that may be encountered while monitoring the operations of the devices 104 and 106.

In view of the above, the adaptive monitor and support device 108 adaptively controls the monitoring process so that optimum monitoring and support is achieved. The monitored data obtained may be tailored to specific purposes such as for software vendors to provide information regarding specific products or for research into consumer behavior. The adaptive monitor and support device 108 may maintain a list of interests so that the monitoring process produces monitored data focused on the needs represented by this list to provide the desired information.

Figure 2:
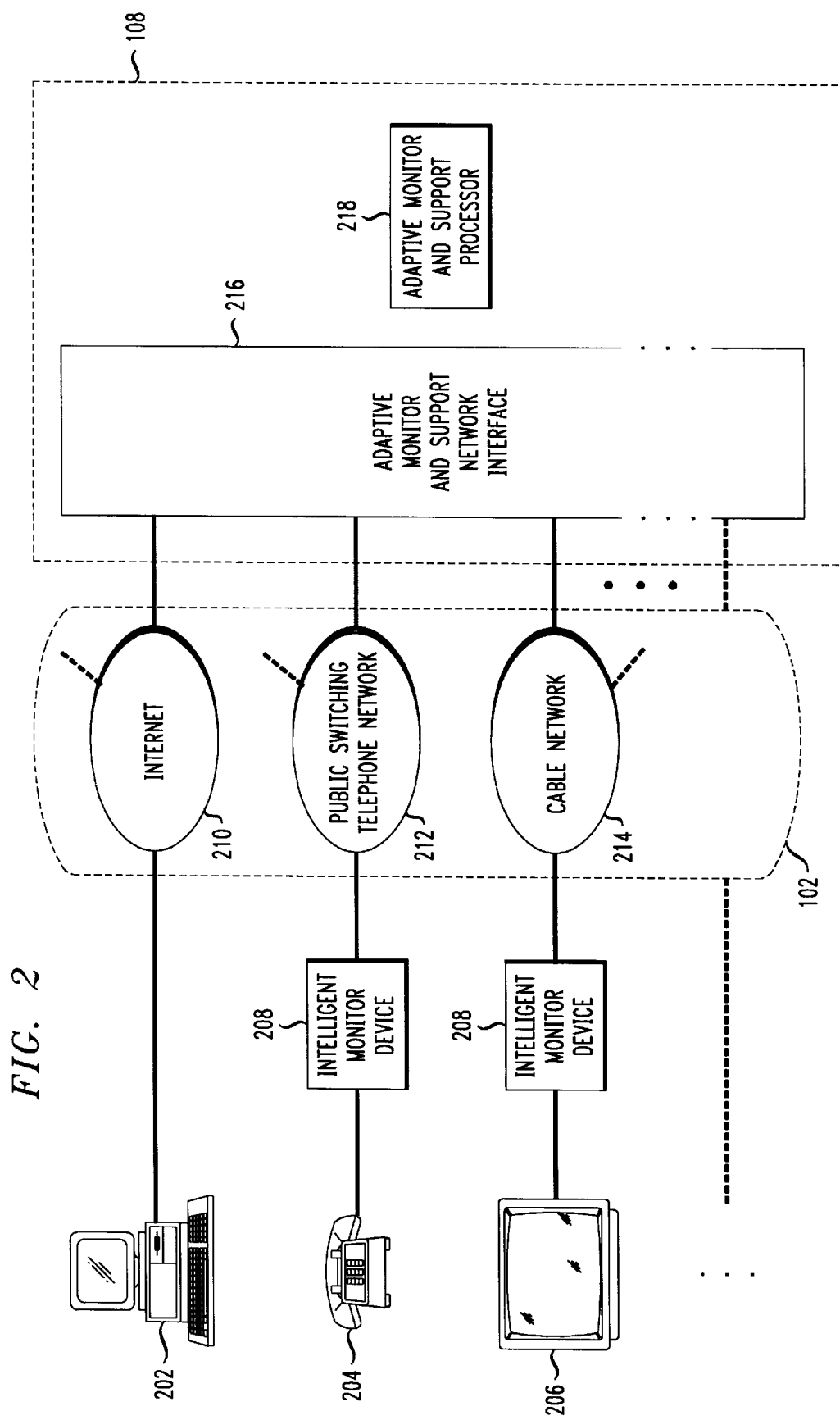
FIG. 2 is an exemplary example of the adaptive monitor and support system shown in FIG. 1.

FIG. 2 shows a more detailed diagram of the adaptive monitor and support system 100 using specific examples. The adaptive monitor and support device 108 includes an adaptive monitor and support processor 218 and an adaptive monitor and support network interface 216. The adaptive monitor and support network interface 216 is coupled to a wide variety of networks such as the Internet 210, the public switching telephone network 212 and the cable network 214 to allow the adaptive monitor and support processor 218 to communicate with the monitored devices such as a personal computer 202, a telephone 204 and a television 206.

A monitored device such as the personal computer 202 includes a controller that supports program execution. Thus, the personal computer 202 serves as a host for the monitoring program which can operate under the personal computer operating system. This is not the case for the telephone 204 or the television 206. Thus, for those non-intelligent monitored devices which do not include the hardware that supports a monitoring program, intelligent monitor devices 208 or 209 (such as a cable box) are used to monitor and control the non-intelligent devices 204, 206 and to interface with the adaptive monitor and support processor 218 through an appropriate network such as the Internet 210, the public switching telephone network 212, and the cable network 214. In the following discussion, monitored devices refer to either intelligent devices or non-intelligent devices and corresponding intelligent monitor devices.

While FIG. 2 shows the personal computer 202 and the intelligent monitor device 208 and 209 connected to the Internet 210, the public switching telephone network 212 and the cable network 214, respectively, these devices may be connected to any of the networks as the circumstances dictate. For example, the personal computer 202 may be connected to the Internet 210, the public switching telephone network 212, and the cable network 214 at the same time and may communicate with the adaptive monitor and support processor 218 through any of these networks.

Figure 3:
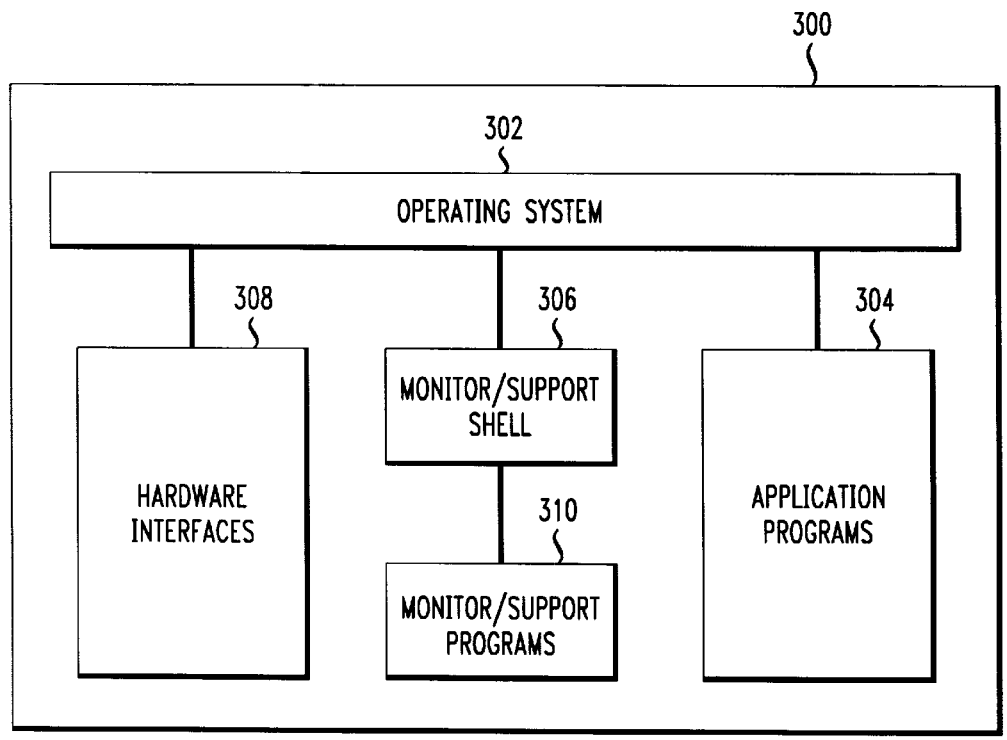
FIG. 3 is a block diagram of a first monitored device.

FIG. 3 shows an intelligent device 300 that represents either an intelligent device such as the personal computer 202 or an intelligent monitor device 208, 209 which contain the hardware necessary for executing monitoring programs. The intelligent device 300 is controlled by software which includes an operating system 302, application programs 304, monitor/support shell 306, monitor/support programs 310, and hardware interfaces 308. The operating system 302 may be software programs such as the Windows 95™, the OS/2™ or the UniX™ operating system or may be a hardware controller that perform similar functions. The operating system 302 provides general control over all the resources of the intelligent device 300 and provide an environment for the application programs 304, the monitor/support shell 306, and the monitor/support programs 310. The hardware interfaces 308 are programs such as device drivers that control specific hardware components. For example, a video card driver, a printer driver or a sound card driver are common in many personal computers.

The monitor/support shell 306 provides a sub-environment under the operating system 302 for monitoring the operations of the monitored devices (the personal computer 202, the intelligent monitor device 208, 209) through the intelligent device 300. For example, in the case of the personal computer 202, the monitor/support shell 306 may have access to signals generated by the hardware interfaces 308 such as a printer driver. Thus, when the printer driver sends commands to a printer or receives a response from a printer, the monitor/support shell 306 detects such signals and takes appropriate action.

For example, if the printer driver has received an error signal from a printer, the monitor/support shell 306 may record the printer error as a monitored event, download a special monitor/support program 310 from the adaptive monitor and support device 108, and launch the special monitor/support program 310 to provide special monitoring to record all the circumstances surrounding the printer error and/or provide support to help the user overcome the problems under such circumstances. The special monitor/support programs 310 is referred to below as either special monitor programs 310 or special support programs 310 as the context requires.

The monitor/support shell 306 may detect launching of application programs (e.g., detecting that a particular icon was selected, an executable file is opened or a window is opened on a display). For example, if the user using a pointing device such as a mouse to select a word processor icon, the monitor/support shell 306 detects such an action and may record a date and time that the word processor was launched and at the same time download and launch a special monitor/support program 310 specifically targeted for the word processor application program. In this way, the monitor/support shell 306 may monitor all the functions performed by the intelligent device 300 and generate appropriate monitored data to be further processed by both the monitor/support shell 306 and the adaptive monitor and support processor 218 when the monitored data is uploaded to the adaptive monitor and support device 108.

The monitor/support shell 306 is able to detect all input and output information of the user. For example, keystrokes from a keyboard are received through the hardware interfaces 308 and detected by the monitor/support shell 306. Similarly, the data displayed on the video monitor are also accessible to the monitor/support shell 306. Thus, when circumstances require, the monitor/support shell 306 or one of the monitor/support programs 310 may record the exact visual display as monitored data.

For example, when the user visits a web site on the Internet, the web page may be completely recorded as monitored data to be either stored locally at the intelligent device 300 or immediately uploaded to the adaptive monitor and support processor 218 for processing. Also, the User Resource Locator (URL) may be recorded.

The monitor/support shell 306 may also communicate directly to the user by outputting data on the video display or sound data through a sound card and receive information from the user through data entry devices such as a keyboard or a mouse. Thus, the monitor/support shell 306 is able to support the user by providing help or direction when required.

The sub-environment provided by the monitor/support shell 306 allows for additional monitor/support programs 310 to be incorporated in real time so that a more comprehensive and specific monitoring and support may be obtained as the circumstances require. When the intelligent device 300 is first powered on and before the user has launched the first application program 304, the monitor/support shell 306 logs the time of power-on and performs monitoring without the help of any monitor/support program 310. In this condition, only a very small amount of processor resources of the intelligent device 300 is consumed and very little monitored data is generated so that memory required to store the monitored data is conserved. If the user decides to launch an application program such as the word processor, then the monitor/support shell 306 may also launch a corresponding monitor/support program 310 in the sub-environment to generate monitored data that is of special interest relating to the word processor. The decision to launch a monitor/support program 310 for the word processor may be based on a profile that corresponds to the intelligent device 300 which is stored in a memory such as a hard disk of the intelligent device 300.

The profile may be generated to direct the monitor/support shell 306 and/or the special monitor/support programs 310 to perform their functions tailored to a specific user. For example, if two users use a monitored device such as a personal computer to do word processing but one user (a father) deals exclusively with text and tables while the other user (a son) cuts and pastes clip art most of the time, the profile may be tailored to require different special monitor/support programs 310 depending on which of the two users are using the word processor.

The profile may also be generated to include information based on desired monitoring and support functions as determined by events such as the user purchasing products or services or requests by third parties such as software or hardware manufacturers that subscribe to consumer monitoring services. For example, when a user purchases a hardware such as a scanner, the scanner manufacturer may provide product installation and usage support through the adaptive monitor and support system 100. The user may install the monitor/support shell 306 to take advantage of the services offered by the scanner manufacturer. Thus, the profile associated with the user intelligent device 300 is updated to identify the scanner hardware and associated application program packaged with scanner operations for monitoring and support consistent with the services purchased by the user.

The scanner manufacturer may also have purchased services for monitoring the usage of the scanner hardware and associated software. For example, the scanner manufacturer may wish to know how often the scanner hardware is used and what other application programs are often used in connection with the scanner hardware. In this case, the profile associated with the intelligent device 300 identifies the scanner hardware for special monitor and support.

If the software required to monitor the scanner consumes a large amount of memory space, all the special monitor programs 310 associated with the scanner may be too large to be stored in the memory of the intelligent device 300. When the user activates the scanner hardware, the monitor/support shell 306 detects such activation and downloads the corresponding required portion of the special monitor programs 310 from either the adaptive monitor and support device 108 or directly from the scanner manufacturer through the Internet, for example. Thus, the profile associated with the intelligent device 300 identifies the scanner hardware as a specially monitored device and also may identify a source from which the monitor/support shell 306 may download needed portions of the special monitor programs 310 to perform the monitoring process.

The monitor/support shell 306 may also have the capability for determining the exact hardware configuration of the intelligent device 300. If, for example, the user purchases a new piece of hardware and installs the hardware in the intelligent device 300, the monitor/support shell 306 may scan the hardware configuration and identify the new hardware. If the manufacturer of the newly installed hardware provides support (perhaps free support for 90 days, for example), the monitor/support shell 306 may send a request to the adaptive monitor and support device 108 to download special support programs 310 for the new hardware. In this way, the adaptive monitor and support device 108 learns of the newly added hardware so that better decisions may be made regarding how best to monitor and support the intelligent device 300. The results of the decisions are communicated to the monitor/support shell 306 so that the profile associated with the intelligent device 300 may be updated to accurately monitor and support the intelligent device 300.

Figure 4:
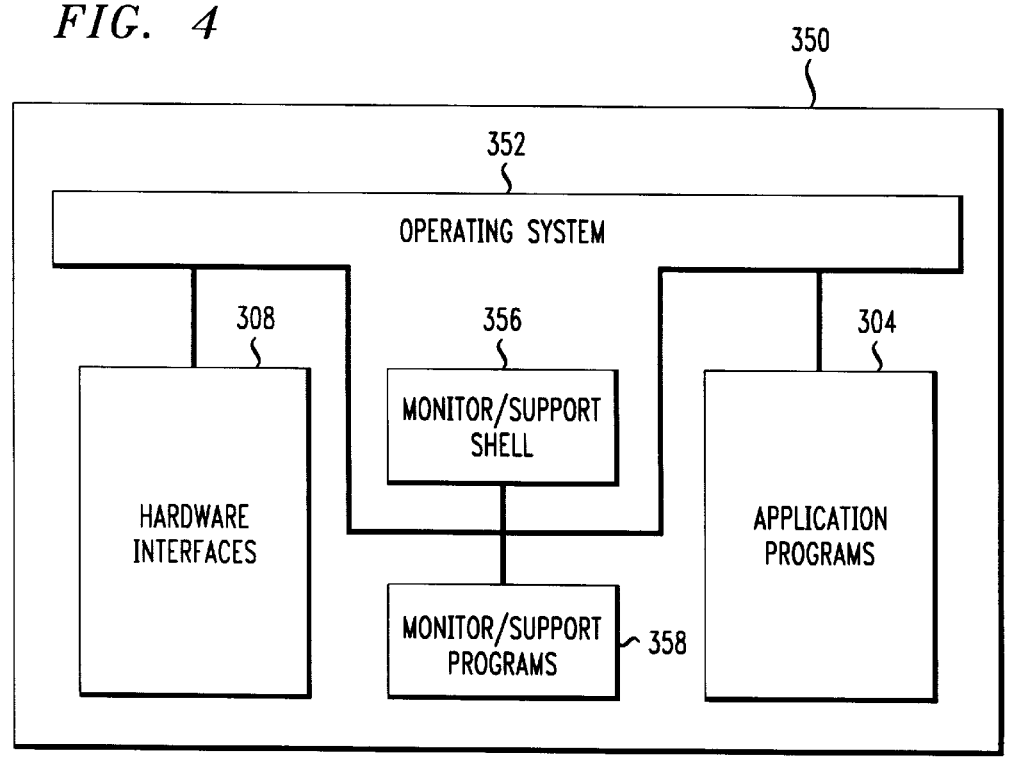
FIG. 4 is a block diagram of a second monitored device.

FIG. 4 shows an operating system 352 that includes a monitor/support shell 356 and monitor/support programs 358. In this embodiment, greater efficiency may be obtained because the monitor/support shell 356 is directly integrated with the operating system 352 and thus has more direct access to the hardware interfaces 308 and application programs 304. Thus, the inefficiencies of an additional interface between the monitor/support shell 306 and the operating system 302 is eliminated.

Figure 5:
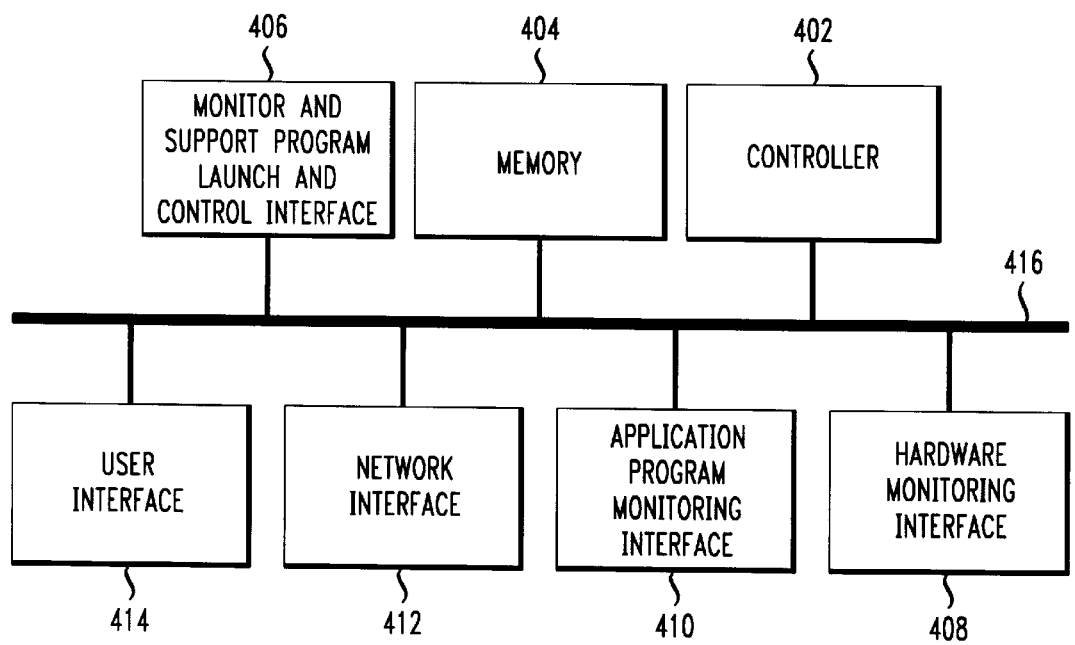
FIG. 5 is a block diagram of an adaptive monitor and support controller.

FIG. 5 shows a block diagram of the monitor/support shell 306. The monitor/support shell 306 includes a controller 402, a memory 404, a monitor and support program launch and support control interface 406, a hardware monitoring interface 408, an application program monitoring interface 410, a network interface 412, and a user interface 414. The above components are coupled together via signal bus 416.

While all of the above components 402-416 are software components because the monitor/support shell 306 is discussed as a software program, the components may also be implemented using hardware such as application specific integrated circuits (ASICs). A hardware implementation improves performance and eliminates the need for memory to store the monitor/support shell 306. Similarly, while the operating system 302 and 352 are discussed as software programs, these could also be hardware components such as state machines, for example. The method by which the operating systems 302, 352 or the monitor/support shell 306, 356 are implemented depends on particular circumstances of the implementation and does not affect the function and performance of the operating systems 302, 352 and the monitor/support shell 306, 356.

The functions of the components shown in FIG. 5 is described in conjunction with Tables I and II below which show two example scenarios of the monitor and support functions. Table I shows a scenario for monitor and support of a personal computer and has five rows of boxes corresponding to time (row 1), device activity (row 2), normal monitoring (row 3), special monitoring options (row 4) and special support options (row 5). Time flows from left to right and row 1 divides time into periods T1, T2, . . . etc. Thus, the events shown in boxes to the left occur earlier in time that the events shown in boxes to the right.

intelligent device 300 are corrected and would not affect the monitoring process. In addition, accurate comparisons of DT may be made across many intelligent devices 300 for monitored data analysis purposes.

Soon after startup, the monitor/support shell 306 retrieves a profile from the memory 404 and searches for any special monitor/support task that is required for this specific intelligent device 300. As indicated in row 4, the monitor/support shell 306 launches a special monitoring program 310 to monitor startup applications and screen saver status. Also, row 5 indicates that a special support program 310 is launched to identify the user.

Prompts such as a pop-up window or an audio message may be used to request the user to enter a user identity. Other methods such as user specific passwords or logon id's serve equally well. The special support program tailors support processes by correlating the user identity with historical data and/or specific user information, for example.

At time period T2, the user launches a word processor as indicated by row 2. The controller 402 detects the launching of the word processor through the application program monitoring interface 410 and records the word processor program name, the file name (if any), the DT and the duration that the word processor is used.

TABLE I

| Time | | | | | | | | | → |
|---|---|---|---|---|---|---|---|---|---|
| 1) Time Period | T1 | T2 | T3 | T4 | T5 | T6 | T7 | T8 | T9 |
| 2) Device activity | Power on | Word Processing | E-Mail | Game | Explorer | Fax | Internet access | Screen saver | Monitor/Support Networking |
| 3) Normal Monitor | Date time | App Name, File Name, DT, Duration | App Name, DT, Duration | App Name, DT, duration | Director and file name, DT, duration | App Name, DT, duration | Brower used, DT, duration | App name, DT, duration | DT, duration |
| 4) Special Monitor Options | Start Up Applications, Screen Saver Status | Menu, file size, clip arts, printer | Address book Email, internet address, Server, name, server software E-Mail handling | Local, network, joystick, sound, mouse, keyboard, multi-players | Hard disk space, drives, trash size | Scanner used, file used, dial up number | Internet Service Provider download, Web Page, Web URL, Search, FTP, Favorite sites, Form inputs | Next User, Time setting, power management, multimedia | |
| 5) Special Support options | Identify User | | Check number of messages on server | | Identify defragmentation or back up needs, empty trash | | clear cache, set TCP/IP properties | Identify new user | Set calendar clock, upload log file, upload user request, download updates, download child usage report |

Row 2 indicates the events occurring in a monitored device such as the intelligent device 300; row 3 indicates the functions performed by the monitor/support shell 306, for example; row 4 indicates monitoring tasks performed by special monitoring programs 310 and row 5 indicates functions that are performed by special support programs 310.

At time period T1, the intelligent device 300 is powered on. After being installed by the operating system 302, the controller 402 of the monitor/support shell 306 records the date and time (DT) of the power-on event in the memory 404 as indicated in row 3. While an intelligent device such as the intelligent device 300 includes an internal clock that maintains a calendar, the controller 402 may obtain a standard time (time stamp) from the adaptive monitor and support device 108 so that errors in the internal clock of the The duration that the word processor is used may be different than the total amount of time between when the word processor is launched and when it is ended. For example, the word processor may be considered to be in use when a window of the word processor is in focus or highlighted. Thus, determining the duration of usages may include analysis of all the recorded data such as keyboard strokes or mouse clicks. While row 3 indicates that the normal monitoring determines a duration in one active time period (T2), the monitor/support shell 306 actually tracks the related application program from launch to end and determines the actual "duration" that the application program is actively being used.

The controller 402 uses the profile to determine whether the word processor requires a special monitor program 310.

If such a program is required, the controller 402 determines based on the profile (or other related files) whether the special monitor program 310 is available in the memory 404 (e.g., in the intelligent device's hard drive) or is available externally and must be downloaded (i.e. from either the adaptive monitor and support device 108 or from a supplier through a network such as the Internet). If the special monitor 310 is available by downloading, the controller 402 downloads the special monitor program 310 through the network interface 412. If the special monitor program 310 is available locally, the controller 402 retrieves the special monitor program 310 from the memory 404. Once installed, the special monitor program 310 is launched by the monitor/support shell 306 through the monitor and support launch and control interface 406. In row 4, at time period T2, the special monitor program 310 monitors menus accessed, file sizes of opened files, clip art used, and printer commands and settings, for example. These and other monitoring tasks may be performed as circumstances dictate.

In time period T3, the user sends e-mail to a destination address while the word processor is still active. For example, the user composes a message using the word processor and decides to send the message via e-mail. The controller 402 detects the e-mail activity and records the name of the application program used to send the e-mail, DT, and duration of the e-mail session. After checking the profile, the controller 402 may download and launch special monitoring/support programs 310. The special monitor programs 310 monitor the e-mail activity such as address book used, Internet address destination, server name, server software, how the e-mail is handled, etc. The special support program 310 also checks the number of messages on the server, for example.

In time period T4, the user launches a video game. The controller 402 detects this activity and records the application name, DT and duration of the video game session. As may be directed by the profile, the controller 402 launches a special monitor program 310 to record, for example, whether the video game is played locally (hard drive, CD ROM, etc.) or played over the network 102, whether a joystick, a mouse and/or a keyboard are/is used, the kind of sound files (e.g., wave files) and whether multiple players are involved.

In time period T5, the user activates an explorer program. The controller 402 records the directory and file name as well as DT, and duration, as indicated in row 3. Based on the profile, the monitor/support shell 306 downloads a special monitoring program 310 that monitors the hard disk space, other drives such as CD ROM and floppy disk drives as well as the amount of memory consumed by the trash bin, as indicated in row 4. For the explorer, the profile indicates that a special support program 310 is required which identifies fragmentation of files, possible backup needs as well as alerting the user that the amount of memory consumed by the trash bin exceeds a predetermined threshold and requests the user to empty the trash bin, as indicated in row 5.

In time period T6, the user launches a fax program (e.g. to fax a file found while using the explorer), as indicated in row 2. The controller 402 again records the application name, DT, and duration. At the same time, the controller 402 launches a special monitoring program 310 as dictated by the profile. The special monitoring program 310 records, for example, the file name used to store the scanned file and the destination number dialed to send the fax.

In time period T7, the user launches an Internet session to access the Internet. The controller 402 records, for example, the type of browser used (e.g., Netscape™) the DT and the duration of the Internet session. As with the other applications, the controller checks the profile and launches both a special monitoring program 310 and a special support program 310 as indicated by rows 4 and 5. The special monitor program 310 records, for example, the name of the Internet service provider, file/software downloads, the image of the web page being displayed, the web User Resource Locator (URL), the search engine(s) used by the user, the files transferred, the source/destination addresses of the file transfers, various web sites visited by the user and any form inputs entered by the user. The data recorded by the special monitoring program 310 may be correlated across a very long period of time to determine the user's favorite sites on the Internet, for example.

The special support program 310 may support the user by clearing the cache used as local storage associated with the Internet, for example. The special support program may also set the TCP/IP property for assisting the user to optimize data transfer supporting the Internet access.

In time period T8, a screen saver is launched (due to inactivity, for example). The controller 402 records the screen saver application name, the DT and the duration, as before. Again, based on the profile, the controller 402 may launch both a special monitoring program 310 as well as a special support program 310. The special monitoring program detects whether the user (or another user) deactivated the screen saver by pressing a key, for example, whether the personal computer screen saver timer setting has been changed, whether the power management system has placed the personal computer in a low power mode (usually due to lack of use for a preset amount of time), and whether multimedia is being used. The special support program 310 is launched to identify a new user by prompting the current user to enter a user identification or if user specific passwords are used, to identify the user via the entered password.

In time period T9, the intelligent device 300 is engaged in a monitor/support networking function where the monitor/support shell 306 itself becomes the main device function. Time period T9 may be during periods of known inactivity such as between 2:00 a.m. to 4:00 a.m., for example. The controller 402 may record the DT as well as the duration of the monitor/support networking process. During this period, the controller 402 may download information from the adaptive monitor and support device 108 to add or change instructions or programs of the monitor/support shell 306 or upgrade components of or the entire monitor/support shell 306. Also, log files containing the monitor data may be uploaded. Other functions such as setting the calendar clock to resynchronize with the adaptive monitor and support device clock, and downloading usage reports may also be performed.

Usage reports contain usage information of specified devices being monitored. For example, a parent may wish to monitor a child's personal computer usage to verify that the child has not visited "prohibited" Internet sites. Business owners may also wish to control employee computer usage to reduce non-work related activity. Thus, the adaptive monitor and support system 100 may monitor a pre-specified list of devices for an authorized party as part of a monitoring system.

While Table I shows the time period T9 occurring only once in nine time periods, the actual time span between successive monitor/support networking time period may vary depending on the circumstances. For example, if the monitor/support shell 306 determines that the user is engaging in an activity that is of special interest and a large amount of monitor data may be generated, frequent uploads and downloads between the monitor/support shell 306 and the adaptive monitor and support device 108 may be necessary. For example, if during the Internet access, the user visits several web sites and the special monitoring program 310 is instructed to record every web page display, it would be necessary for the monitor/support shell 306 to upload the web pages to the adaptive monitor and support device 108 on a frequent basis because of the large amount of storage required to save many web pages. Thus, the period between the monitor/support networking task may be as short as seconds or minutes and may be as long as several days or months depending on the circumstances.

Table II shows a monitor/support process directed to a non-intelligent device such as a telephone. As shown in FIG. 2, such a non-intelligent device is monitored through an intelligent monitor device 208, 209, for example. Table II shows five time periods T1–T5 corresponding to voice, data, voice, fax and monitor/support networking, respectively. The voice indicates analog audio transmission, the data indicates data packet transmission and fax indicates transmission of bit files which are bitmap images. The monitor/support networking activity is similar to the corresponding activity shown in Table I.

optimize the monitoring process based on the profile alone. If special conditions are detected in the uploaded monitored data that require further adjustment of the monitoring process, the adaptive monitor and support processor 218 may download instructions to the controller 402 through the network interface 412 to change the monitoring process. For example, if the adaptive monitor and support processor 218 discovers that one of the launched applications is a background task that involves a lot of activity without the user's interaction, instructions may be downloaded to the controller 402 to terminate the special monitor/support program 310 corresponding to this application to reduce the amount of resources such as memory and processor time in favor of other more important monitor/support tasks. Thus, the monitor/support process is adaptively adjusted either locally by requesting and launching special monitor/support programs 310 or remotely by the adaptive monitor and support processor 218 instructing the controller 402 to modify the monitoring process.

Figure 6:
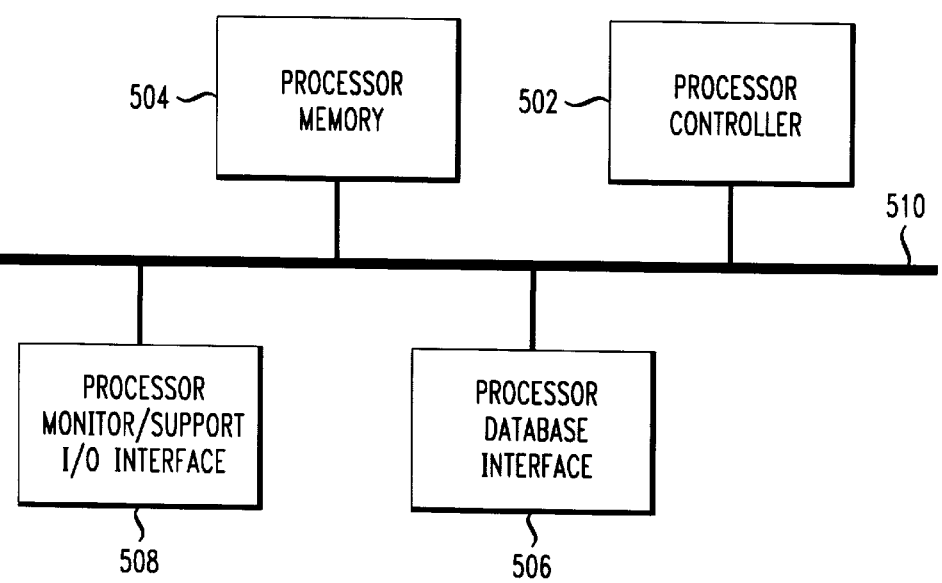
FIG. 6 is a block diagram of an adaptive monitor and support device.

FIG. 6 shows a block diagram of the adaptive monitor and support processor 218. The adaptive monitor and support processor 218 includes a processor controller 502, a processor memory 504, a processor database interface 506, and a processor monitor/support I/O interface 508. The above components are coupled together via the signal bus 510.

TABLE II

| Time | | | | | → |
|---|---|---|---|---|---|
| 1) Time Period | T1 | T2 | T3 | T4 | T5 |
| 2) Device activity | Voice | Data | Voice | Fax | Monitor/Support Data |
| 3) Normal Monitor | DT, duration, inbound/outbound, number | DT, duration, inbound/outbound, number | DT, duration, inbound/outbound, number | DT, duration, inbound/outbound, number | DT, duration, inbound/outbound, number |
| 4) Special Monitor Options | In-service digits, call type (local, region, long distance international) | | In-service digits, call type (local, region, long distance, international) | Number of pages | |
| 5) Special support options | | | | | Set clock, upload log file, download updates |

Because the device being monitored and supported is very simple, the normal monitoring performed by the controller 402 is the same for each time period. For example, the controller 402 records DT, duration, whether the communication is inbound or outbound, and the number of the other party during every time period. If special monitoring is required by the profile, a special monitoring program 310 may be downloaded to the intelligent monitor device 208 to record in-service digits and/or a call type (e.g., local, regional, long distance or international). During the fax of time period T4, the special monitoring program 310 may also record the number of pages being faxed. As shown in Table II, the special support program 310 is only required during the monitor/support networking time period T5 to set the calendar clock of the intelligent monitor device 208, to upload monitored data recorded in a log file and download updates to the intelligent monitor device 208.

The adaptive monitor and support processor 218 may further process uploaded monitored data in "real time" (i.e. process the monitored data as soon as it is uploaded) in accordance with the special monitor support requirements to While FIGS. 1 and 2 show the adaptive monitor and support device 108 as a single unit, the adaptive monitor and support device 108 may include a bank of devices at a central location or devices distributed throughout the network 102. The functions of the adaptive monitor and support device 108 may be performed by the many servers within the network 102, for example.

The processor controller 502 interfaces via the network 102 with the controllers 402 of the various monitor/support shells 306 operating within the intelligent devices 300 (the personal computer 202, or the intelligent monitor devices 208, 209). When a request from one of the controllers 402 is received through the processor monitor/support I/O interface 508, the processor controller 502 retrieves data from the processor memory 504 or from external databases through the processor database interface 506 to determine the proper course of action. The database 110 shown in FIG. 1 includes information regarding each of the devices 104 and 106 and the type of hardware and software capabilities that are available for each of the devices 104 and 106. In addition, subscribers to a service, such as software and hardware manufacturers, may request special monitoring of the various product usages so that product development and service trends may be obtained. Thus, the processor controller 502 retrieves from the database 110 the above information from either the processor memory 504 or the processor database interface 506 to determine whether special monitoring and support is required.

If special monitoring or support is required, the processor controller 502 may either download instructions or special monitor/support programs 310 to the controller 402 to change the monitoring/supporting processes as appropriate. In addition, if the monitor/support programs 310 are required, the processor controller 502 determines whether such programs are available locally with respect to the processor controller 502 or whether these programs should be obtained directly from the respective manufacturers. If the needed programs are accessible to the processor controller 502, these programs are downloaded directly to the devices 104 and 106 through the processor monitor/support I/O interface 508. Otherwise, instructions are downloaded to the controller 402 for direct retrieval of the needed programs from the respective manufacturers.

Monitored data is uploaded to the adaptive monitor and support processor 218 through the processor monitor/support I/O interface 508 and stored in the processor memory 504 or through the processor database interface 506 to an external memory. At an appropriate time, the processor controller 502 retrieves the uploaded monitored data and processes this monitored data to determine whether any actions should be taken to further tailor the monitoring processes at the devices 104 and 106. The monitored data is also processed to obtain the data requested such as usage trends and software or hardware performance.

Figure 7:
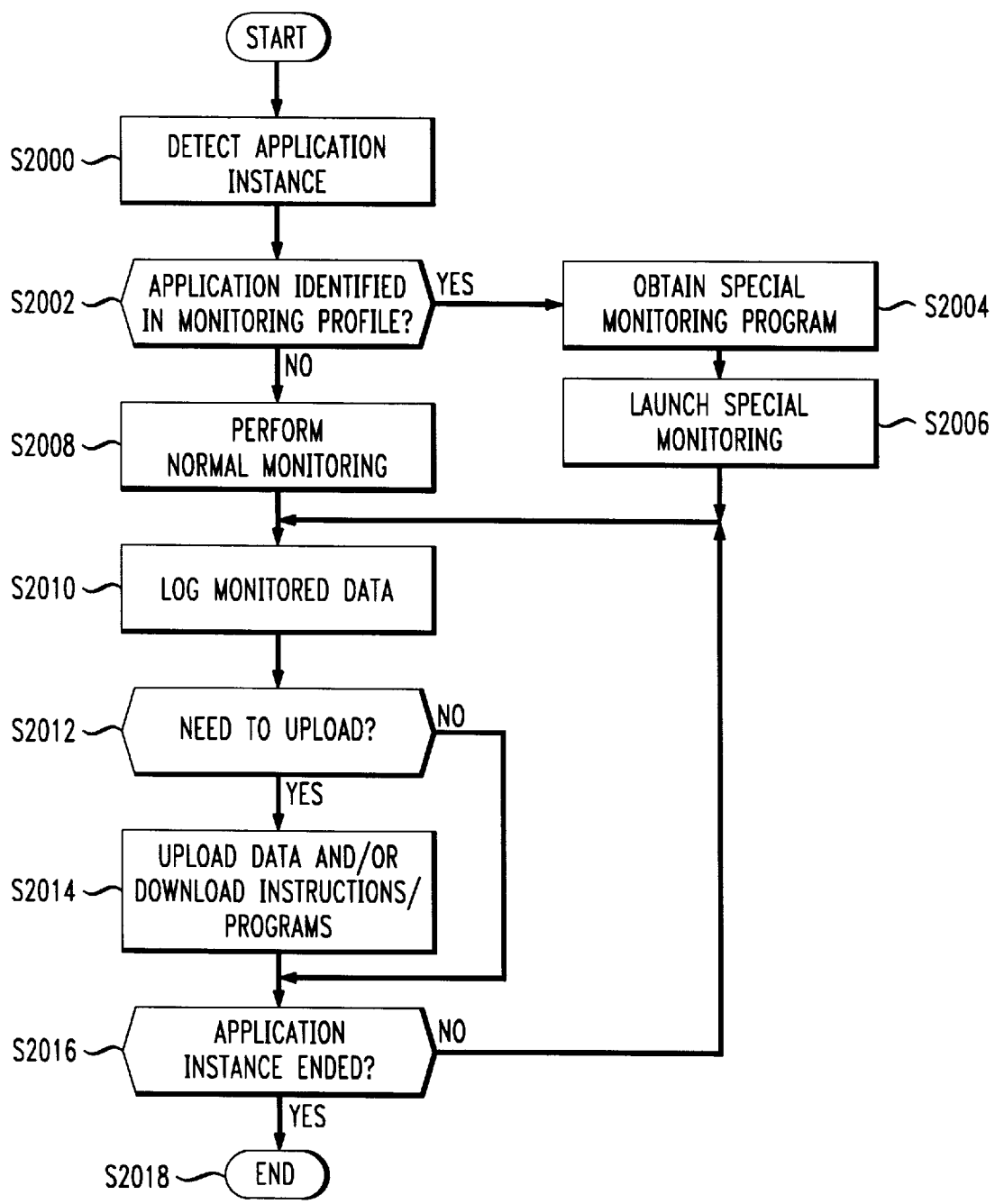
FIG. 7 shows a flow chart of a monitoring process.

FIG. 7 shows a flow chart for a monitoring process of the controller 402 when an instance of an application is launched. In step S2000, the controller 402 detects that the application is launched and goes to step S2002. In step S2002, the controller 402 determines whether the launched application was identified in the profile. If the application was identified in the profile, the controller 402 goes to step S2004; otherwise the controller goes to step S2008. In step S2004, the controller 402 obtains the special monitor program 310 and goes to step S2006. In step S2006, the controller 402 installs and launches the special monitor program 310 and goes to step S2010. The controller 402 may interact with the user during execution of the special monitor program 310.

In step S2008, the controller 402 performs the normal monitoring tasks as indicated in the Tables I and II and goes to step S2010. In step S2010, the controller 402 logs monitored data and goes to step S2012. In step S2012, the controller 402 determines whether the logged monitored data needs to be uploaded to the adaptive monitor and support device 108. If an upload is needed, the controller 402 goes to step S2014; otherwise, the controller 402 goes to step S2016.

In step S2014, the controller 402 uploads the monitored data to the adaptive monitor and support device 108 and goes to step S2016. In step S2016, the controller 402 determines whether the application has ended. If ended, the controller 402 goes to step S2018 and ends; otherwise, the controller 402 returns to step S2010.

Figure 8:
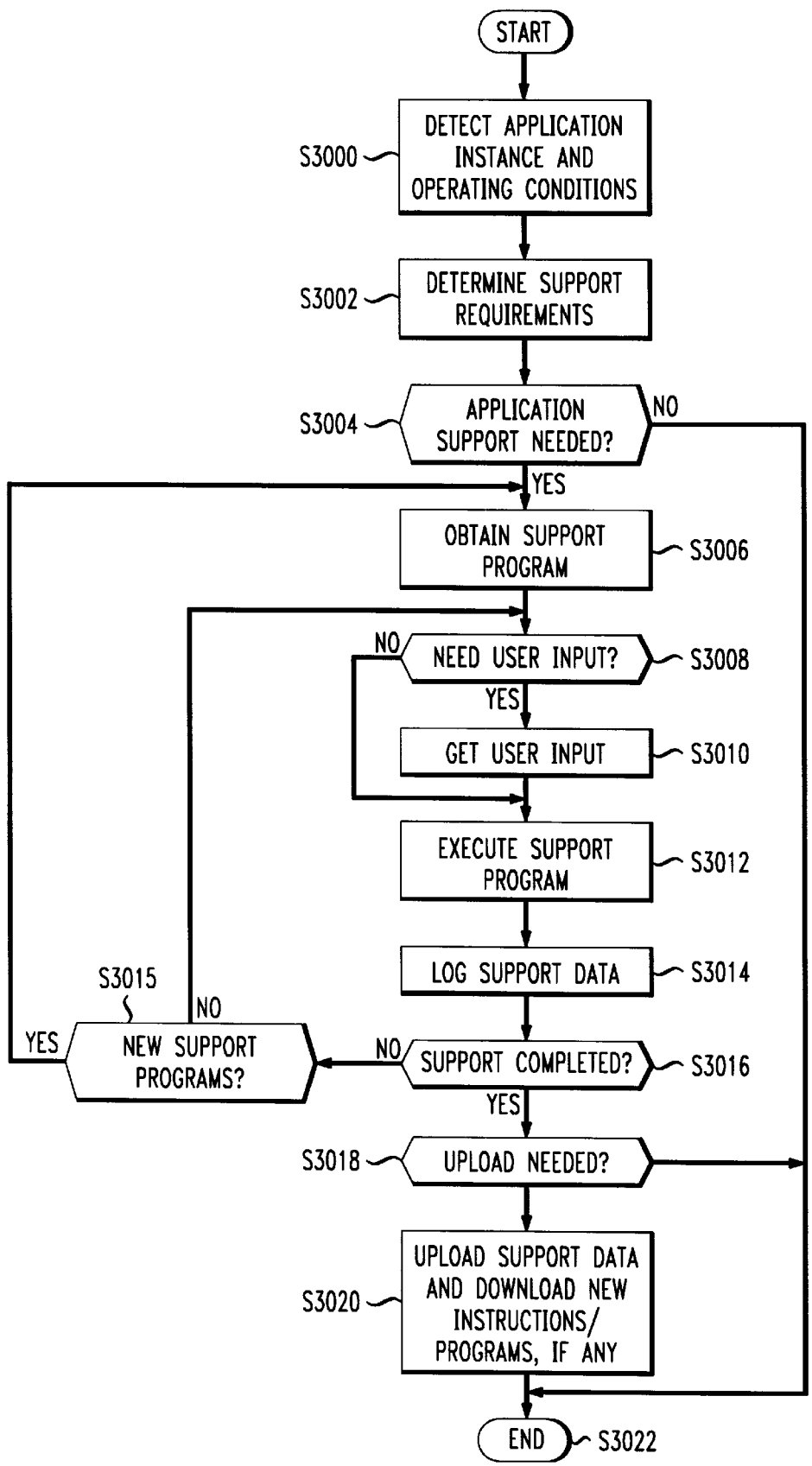
FIG. 8 shows a flow chart for supporting an application.

FIGS. 8 shows a flow chart of a controller 402 process for supporting an instance of an application. In step S3000, the controller 402 determines whether a supported application is launched and determines the application operating condition's (i.e., initial parameter settings) and goes to step S3002. In step S3002, the controller 402 determines support requirements for the application and goes to step S3004. In step S3004, the controller 402 determines whether application support is needed. If needed, the controller 402 goes to step S3006; otherwise, the controller 402 goes to the step S3022 and ends. In step S3006, the controller 402 obtains the specialized support programs 310 by either retrieving these programs 310 from the memory 404 accessible by the intelligent device 300 or downloads these programs 310 from either the adaptive monitor and support device 108 or from an external database provided by the manufacturer, for example. Then, the controller 402 goes to step S3008.

In step S3008, the controller 402 determines whether user input is required (e.g., to obtain user demographic data). If user input is required, the controller 402 goes to step S3010; otherwise the controller 402 goes to step S3012. In step S3010, the controller 402 obtains the user input and goes to step S3012. In step S3012, the controller 402 launches the required special support programs 310 and goes to step S3014. The controller 402 may also interact with the user during execution of the special support programs 310. In step S3014, the controller 402 logs support data (i.e., the data that is generated during a support operation) and goes to step S3016. In step S3016, the controller 402 determines whether the support process is completed. If completed, the controller 402 goes to step S3018; otherwise the controller 402 goes to step S3015. In step S3015, the controller 402 determines whether new support programs are needed. If needed, the controller 402 goes to step S3006; otherwise the controller 402 goes to step S3008.

In step S3018, the controller 402 determines whether an upload of the support data to the adaptive monitor and support device 108 is needed. If needed, the controller 402 goes to step S3020; otherwise, the controller 402 goes to step S3022 and ends. In step S3020, the controller 402 uploads the support data and takes this opportunity to also download any new instructions or programs from the adaptive monitor and support device 108, if required. Then, the controller 402 goes to step S3022 and ends.

Figure 9:
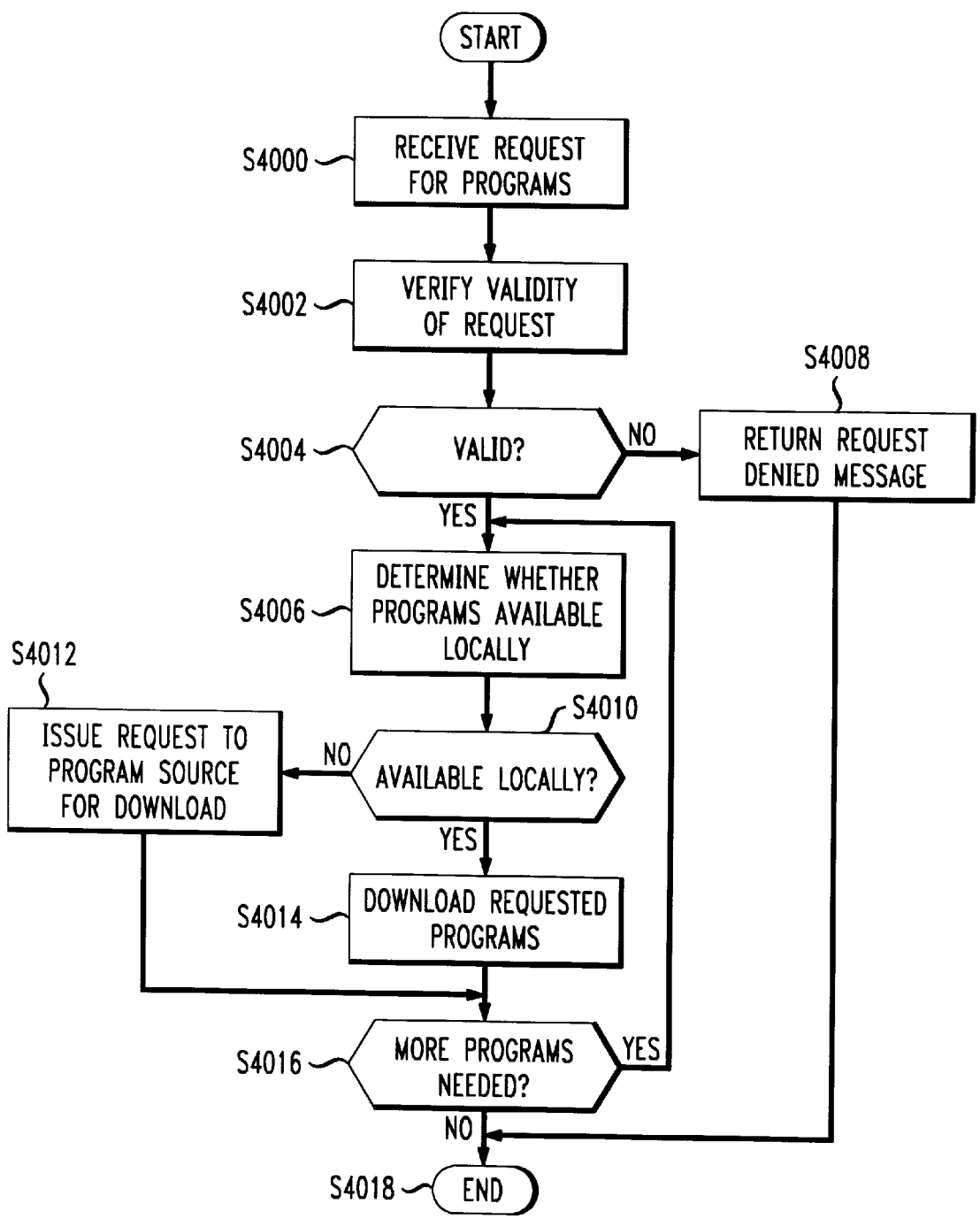
FIG. 9 shows a flow chart for the adaptive monitor and support device responding to a request for programs.

FIG. 9 shows a process of the processor controller 502 for responding to a request for programs received from the controller 402. In step S4000, the processor controller 502 receives the request from the controller 402 and goes to step S4002. In step S4002, the processor controller 502 verifies the validity of the request and goes to step S4004. For example, a request must identify the personal computer by serial number and the user by name. In step S4004, if the request is valid, the processor controller 502 goes to step S4006; otherwise, the processor controller goes to step S4008. In step S4008, the processor controller 502 returns a request denied message to the controller 402 and goes to step S4018 and ends the process.

In step S4006, the processor controller 502 determines whether each of the requested programs are available locally with respect to the processor controller 502 and goes to step S4010. In step S4010, for each program, if the program is available locally, the processor controller 502 goes to step S4014; otherwise, the processor controller 502 goes to step S4012. In step S4012, the processor controller 502 issues a request to the controller 402 to download the program from the manufacturer directly and goes to step S4016. In step S4014, the processor controller 502 downloads the program to the controller 402 and goes to step S4016.

In step S4016, the processor controller 502 determines whether more programs are needed. If more programs are needed, the processor controller 502 returns to step S4006; otherwise, the processor controller 502 goes to step S4018 and ends the process.

Figure 10:
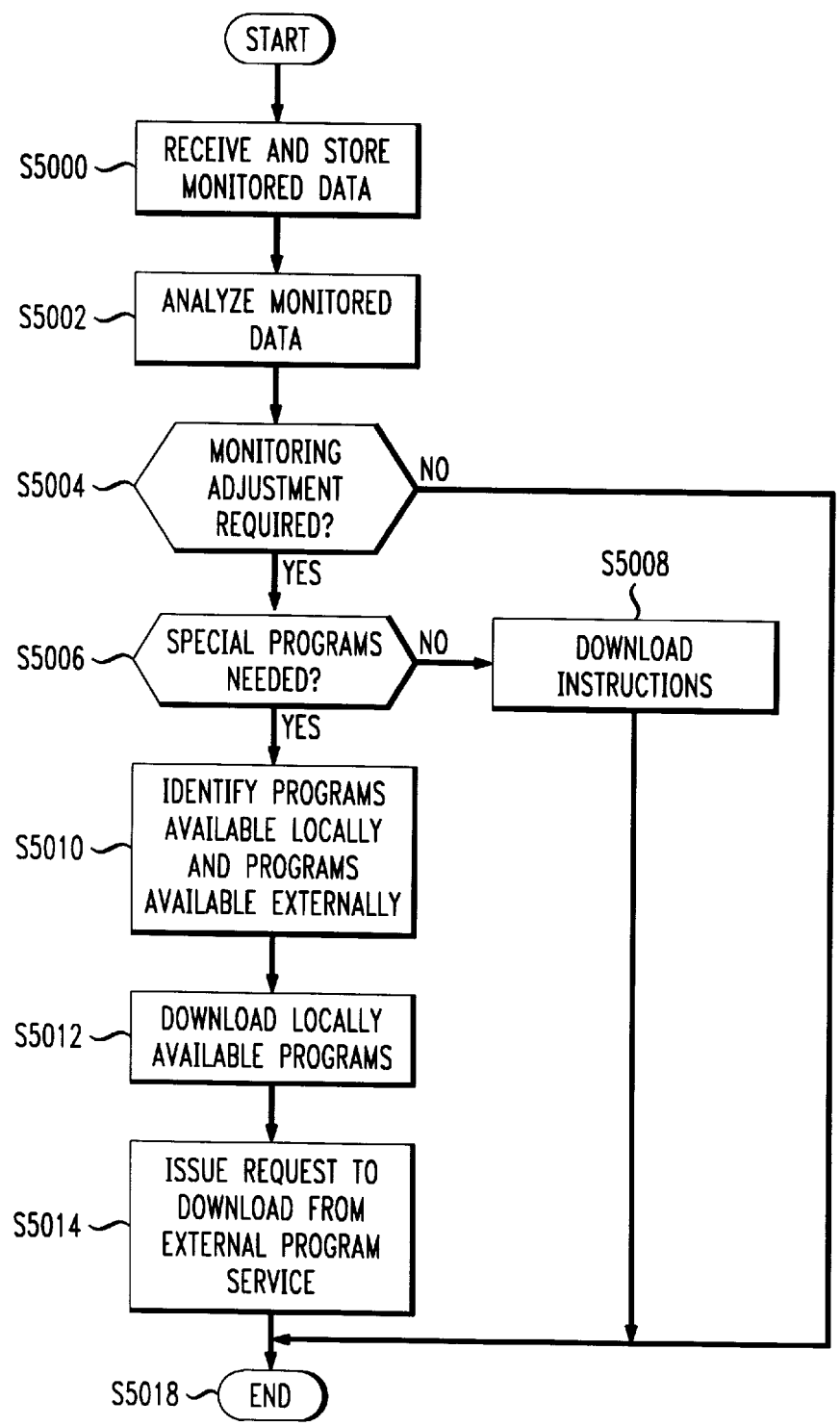
FIG. 10 shows a process of the adaptive and monitor/support device adjusting the monitoring process of an operating device.

FIG. 10 shows a flow chart of the processor controller 502 processing monitored data. In step S5000, the processor controller 502 receives monitored data from the controllers 402, stores the monitored data in a file corresponding to a device 104, 106 and/or a user identified with the monitored data and goes to step S5002. In step S5002, the processor controller 502 analyzes the monitored data and goes to step S5004. In step S5004, the processor controller 502 determines whether monitoring adjustments are required. If adjustments are required, the processor controller 502 goes to step S5006; otherwise, the processor controller goes to step S5018 and ends the process.

In step S5006, the processor controller 502 determines whether special monitor/support programs 310 are needed. If needed, the processor controller 502 goes to step S5010; otherwise, the processor controller goes to step S5008. In step S5008, the processor controller 502 downloads instructions to the controller 402 and goes to step S5018 and ends the process.

In step S5010, the processor controller identifies which of the needed programs 310 are available locally and which are available externally with respect to the processor controller 502 and goes to step S5012. In step S5012, the processor controller 502 downloads the special programs 310 that are available locally to the controller 402 and goes to step S5014. In step S5014, the processor controller issues a request to the controller 402 to download the needed programs 310 from external program sources and goes to step S5018 and ends the process.

While this invention has been described in conjunction with specific embodiments thereof, it is evident that many alternative, modifications, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A method for operating an adaptive monitor/support system in a network, the adaptive monitor/support system monitoring and/or supporting a plurality of operating devices, each of the operating devices being coupled to the network, the method comprising:

monitoring each of the plurality of operating devices, using a monitoring process to determine whether one or more device functions are performed for supporting a user of the device or for collecting information of device function usage; and adjusting the monitoring process for each operating device based on a profile of each operating device and first results of the monitoring step by downloading information from an adaptive monitor/support device that is not part of the operating devices.

2. The method of claim 1, further comprising:

processing the first results of the monitoring step to generate monitored data; and searching the monitored data for a launching or an ending of at least one device function identified in the profiles.

3. The method of claim 2, wherein the adjusting step modifies the monitoring processes to account for the launching or the ending of the device function by downloading at least one of a process and an instruction from the adaptive monitor/support device.

4. The method of claim 1, wherein the operating devices include at least one of an intelligent device and a non-intelligent device, the non-intelligent device being monitored through an intelligent monitoring device, the intelligent device and the intelligent monitoring device include a monitor/support shell that controls a monitoring process.

5. The method of claim 4, wherein an operating device of the plurality of operating devices corresponds to a profile, the profile including at least one pre-specified function that may be performed in the operating device, the monitor/support shell detecting a launching or ending of the pre-specified function based on the profile.

6. The method of claim 5, wherein the adaptive monitor/support device has access to monitor processes and support processes additional to monitor and support processes being controlled by the monitor/support shell, the monitor/support shell downloading at least one of the monitor processes, the support processes, and instructions from the adaptive monitor/support device to adjust a monitoring process of the operating device.

7. The method of claim 6, wherein the profile is tailored to direct the monitor/support shell and/or the monitor processes and/or the support processes based on which one of a plurality of users is using the operating device.

8. The method of claim 6, wherein the monitor/support shell and/or the monitor processes and/or the support processes interact with a user of the operating device to receive and/or output information to the user.

9. The method of claim 6, wherein the monitor/support shell downloads the monitor and/or support processes from either the adaptive monitor/support device or from a source external to the adaptive monitor/support system.

10. The method of claim 6, wherein the adaptive monitor/support device uploads the monitored data from the operating devices and processes the monitored data to generate second results, the adaptive monitor/support device downloading instructions to the operating devices to launch a new process, to delete a current process or to change the monitoring processes based on the second results.

11. The method of claim 1, wherein the operating devices include one of computers, televisions, telephone stations, cable boxes, entertainment controllers, intelligent appliances and intelligent home security systems.

12. An adaptive monitor/support system operating in a network that monitors and/or supports a plurality of operating devices, each of the operating devices being coupled to the network, the adaptive monitor/support system comprising:

an adaptive monitor/support device; and monitor/support shells, each of which is operating in a corresponding operating device of the operating devices, wherein a monitor/support shell generates first results for the corresponding operating device by monitoring process that determines whether one or more device functions are performed for supporting a user of the device for collecting information of device function usage and adjusting the monitoring process based on a profile of each operating device and first results of the monitoring process by downloading information from the adaptive monitor/support device that is not part of the operating devices.

13. The system of claim 12, wherein the monitor/support shells process the first results of the monitoring step to generate monitored data and search the monitored data for a launching or an ending of at least one device function identified in the profiles.

14. The system of claim 13, wherein the monitor/support shells modify the monitoring processes to account for the launching or the ending of the device function by downloading at least one of a process and an instruction from the adaptive monitor/support device.

15. The system of claim 12, wherein the operating devices include at least one of an intelligent device and a non-intelligent device, the non-intelligent device being monitored through an intelligent monitoring device, the intelligent device and the intelligent monitoring device include a monitor/support shell that controls a monitoring process.

16. The system of claim 15, wherein an operating device of the plurality of operating devices corresponds to a profile, the profile including at least one pre-specified function that may be performed in the operating device, the monitor/support shell detecting a launching or ending of the pre-specified function based on the profile.

17. The system of claim 16, wherein the adaptive monitor/support device has access to monitor processes and support processes additional to monitor and support processes being controlled by the monitor/support shell, the monitor/support shell downloading at least one of the monitor processes, the support processes, and instructions from the adaptive monitor/support device to adjust a monitoring process of the operating device.

18. The system of claim 17, wherein the profile is tailored to direct the monitor/support shell and/or the monitor processes and/or the support processes based on which one of a plurality of users is using the operating device.

19. The system of claim 17, wherein the monitor/support shell and/or the monitor processes and/or the support processes interact with a user of the operating device to receive and/or output information to the user.

20. The system of claim 17, wherein the monitor/support shell downloads the monitor and/or support processes from either the adaptive monitor/support device or from a source external to the adaptive monitor/support system.

21. The system of claim 17, wherein the adaptive monitor/support device uploads the monitored data from the operating devices and processes the monitored data to generate second results, the adaptive monitor/support device downloading instructions to the operating devices to launch a new process, to delete a current process or to change the monitoring processes based on the second results.

22. The system of claim 12, wherein the operating devices include one of computers, televisions, telephone stations, cable boxes, entertainment controllers, intelligent appliances and intelligent home security systems.

* * * * *